United States Patent
Crosby et al.

(10) Patent No.: US 7,908,038 B2
(45) Date of Patent: *Mar. 15, 2011

(54) METHOD OF MAKING AN OPTICAL TRANSPONDER

(75) Inventors: Philip S. Crosby, Portland, OR (US); Alejandro E. Icaza, Beaverton, OR (US)

(73) Assignee: Null Networks LLC, Las Vegas, NV (US)

( * ) Notice: Subject to any disclaimer, the term of this patent is extended or adjusted under 35 U.S.C. 154(b) by 171 days.

This patent is subject to a terminal disclaimer.

(21) Appl. No.: 11/513,752

(22) Filed: Aug. 30, 2006

(65) Prior Publication Data

US 2007/0073447 A1    Mar. 29, 2007

Related U.S. Application Data

(63) Continuation of application No. 10/307,104, filed on Nov. 27, 2002, now abandoned.

(51) Int. Cl.
    G05D 23/00    (2006.01)
    H04B 10/00    (2006.01)
(52) U.S. Cl. ........................ 700/299; 398/136
(58) Field of Classification Search .................. 398/135, 398/136; 700/299
    See application file for complete search history.

(56) References Cited

U.S. PATENT DOCUMENTS

| | | | |
|---|---|---|---|
| 5,345,455 A | 9/1994 | Gabriagues et al. | |
| 5,557,437 A | 9/1996 | Sakai et al. | |
| 5,604,757 A | 2/1997 | Liang et al. | |
| 6,629,638 B1 * | 10/2003 | Sanchez | 235/454 |
| 7,761,010 B2 * | 7/2010 | Crosby et al. | 398/136 |
| 2002/0149821 A1 * | 10/2002 | Aronson et al. | 359/152 |
| 2003/0020979 A1 | 1/2003 | Bell | |
| 2003/0152118 A1 * | 8/2003 | Chieng et al. | 372/34 |
| 2003/0174454 A1 * | 9/2003 | Fu et al. | 361/103 |
| 2005/0249468 A1 * | 11/2005 | Aronson et al. | 385/92 |

OTHER PUBLICATIONS

"Network Elements Ships First 10 Gb/s MiniPHY Optical Networking Module Meeting ITU Standards Over Full Temperature Range". Business Wire (Jul. 9, 2001).*

"Network Elements Ships First 10 Gb/s MiniPHY Optical Networking Module Meeting ITU Standards Over Full Temperature Range." Business Wire. Business Wire. Jul. 9, 2001. Retrieved Jun. 5, 2009 from HighBeam Research: http://www.highbeam.com/doc/1G1-76390589.html.*

"Network Elements Offers Unparalleled Advantages in Size and Power With New 10 Gigabit 300-pin Optical Networking Module." Business Wire. Business Wire. Aug. 27, 2001. Retrieved Jun. 5, 2009 from HighBeam Research: http://www.highbeam.com/doc/1G1-77551782.html.*

(Continued)

*Primary Examiner* — Ryan A Jarrett
(74) *Attorney, Agent, or Firm* — Schwabe, Williamson & Wyatt, P.C.

(57) ABSTRACT

Methods and apparatus are provided in accordance with the present invention in which a control mechanism, such as for example, a microcontroller, provides an interface between an optical transponder and an external control system, such that monitoring and controlling of the optical components of the optical transponder are accomplished in an efficient and cost-effective manner. In some embodiments of the present invention, methods and apparatus provide for testing and calibration of the optical transponder without removing any portion of a protective housing within which the internal components of the optical transponder are disposed.

27 Claims, 7 Drawing Sheets

OTHER PUBLICATIONS

"Network Elements Introduces VSR —600m—Optical Networking Module; Very-Short-Reach 10Gb/s Optical Networking Modules Now Available." Business Wire. Business Wire. Mar. 19, 2001. Retrieved Jun. 5, 2009 from HighBeam Research: http://www.highbeam.com/doc/1G1-71808874.html.*
"10Gb/s MiniPHY 200-pin Module". Network Elements, Inc. (no date). Retrieved Jun. 5, 2009 from the Datasheet Archive: http://www.datasheetarchive.com/MiniPHY-datasheet.html.*
"Optical Networking Modules: 10Gb/s MiniPHY-300 VSR 600m Module". Network Elements, Inc. (no date). Retrieved Jun. 5, 2009 from The Datasheet Archive: http://www.datasheetarchive.com/MiniPHY-datasheet.html.*
Harvard Architecture. Retrieved from Wikipedia Oct. 23, 2009.*
Harvard Mark I. Retrieved from Wikipedia Oct. 23, 2009.*
"New Products", IEEE Communications Magazine, Oct. 2001, pp. 152-156.
http://www.edn.com/article/CA152882.html—("MiniPHY 200").
http://www.opticalkeyhole.com/ondtextprint.asp?id=16846 &pd=Aug. 30, 2001—(MiniPHY 300).
http://www.fiberoptictechnology.net/scripts/ShowPR.asp-?PUBCODE=025&ACCT=004311&ISSUE=0107 &RELTYPE=PR&PRODCODE=M162&PRODLETT=B.
http://web.archive.org/web/20011211100737/www.networkelements.com/html/products/index.html.
http://www.convergedigest.com/Daily/v6/v6n218.htm#NETWORK%20ELEMENTS%20$12%20MILLION%20FOR%20OPTICAL%20ASIC%20DEVELOPMENTS.
http://www.convergedigest.com/Daily/v8/v8n003.htm.
Office Action mailed Feb. 25, 2008 in U.S. Appl. No. 10/307,104.
Office Action mailed Apr. 15, 2008 in U.S. Appl. No. 10/307,104.
Office Action mailed Sep. 10, 2008 in U.S. Appl. No. 10/307,104.
Office Action mailed Feb. 6, 2009 in U.S. Appl. No. 10/307,104.
Office Action, issued in U.S. Appl. No. 10/307,104, mailed Jun. 8, 2009.
Advisory Action, issued in U.S. Appl. No. 10/307,104, mailed Sep. 2, 2009.
Office Action, issued in U.S. Appl. No. 10/307,104, mailed Jan. 31, 2005.
Office Action, issued in U.S. Appl. No. 10/307,104, mailed Feb. 1, 2007.
Office Action, issued in U.S. Appl. No. 10/307,104, mailed Aug. 6, 2004.
Office Action, issued in U.S. Appl. No. 10/307,104, mailed Jan. 7, 2004.
Office Action, issued in U.S. Appl. No. 10/307,104, mailed Jun. 18, 2003.
Office Action, issued in U.S. Appl. No. 10/307,104, mailed Jul. 12, 2007.
Office Action, issued in U.S. Appl. No. 10/307,104, mailed Jul. 10, 2006.
Office Action, issued in U.S. Appl. No. 10/307,104, mailed Aug. 27, 2007.
Office Action, issued in U.S. Appl. No. 10/307,104, mailed Nov. 22, 2006.
Office Action, issued in U.S. Appl. No. 10/307,104, mailed Nov. 21, 2006.
Office Action, issued in U.S. Appl. No. 12/177,681, mailed Oct. 30, 2009.
Notice of Allowance, issued in U.S. Appl. No. 12/177,684, mailed Mar. 12, 2010.

* cited by examiner

METHOD OF MAKING AN OPTICAL TRANSPONDER

This is a continuation of U.S. patent application Ser. No. 10/307,104, filed on Nov. 27, 2002, now abandoned.

BACKGROUND OF THE INVENTION

1. Field of the Invention

The present invention relates generally to computer-based industrial control systems, such as microprocessor control of analog and digital functionality, and more particularly relates to methods and apparatus for calibrating, monitoring, and controlling optical transponders.

2. Background Information

With advances in integrated circuit, microprocessor, networking and communication technologies, an increasing number of devices, in particular, digital computing devices, are being networked together. Such devices are often first coupled to a local area network, such as an Ethernet-based office/home network. In turn, the local area networks are interconnected together through wide area networks, such as Synchronous Optical Networks (SONET), Asynchronous Transfer Mode (ATM) networks, Frame Relays, and the like. Of particular importance is the TCP/IP based global inter-network, the Internet. The rapid growth of the Internet has fueled a convergence of data communication (datacom) and telecommunication (telecom) protocols and requirements. It is increasingly important that data traffic be carried efficiently across local, regional and wide area networks.

As a result of this trend of increased connectivity, an increasing number of applications that are network dependent are being deployed. Examples of these network dependent applications include, but are not limited to, the World Wide Web, email, Internet-based telephony, and various types of e-commerce and enterprise applications. The success of many content/service providers as well as commerce sites depends on high-speed delivery of a large volume of data across wide areas. In turn, this trend leads to an increased demand for high-speed data trafficking equipment, such as high-speed optical-electrical routers or switches and the like. In other words, as a widening variety of new and traditional services converge across shared inter-networking transport structures, there is a critical need for the Internet to simultaneously deliver higher bandwidths, more reliable service, and greater deployment flexibility.

The widespread deployment of high-speed networking and communications equipment has produced a large demand for various types of networking and communications components and subsystems. Included among these are modules often referred to as optical transponders.

Optical transponders typically include components for both electrical signal processing, and components for transmission and reception of optical signals. Conventional optical transponders typically receive electrical signals in parallel, serialize the data represented by these signals, convert the serialized data into a light-based signal and couple that signal to an outbound optical fiber. Similarly, conventional optical transponders, typically receive a serialized light-based data stream, convert that data stream to an electrical equivalent, de-serialize that data, and provide the de-serialized electrical data, i.e., data in a parallel format, to a plurality of output terminals. Conventional optical transponders typically include a case, or housing, within which the electrical and optical components are housed. Such a case provides physical protection for the components, and also provides thermal conductivity so that heat may be dissipated from the components disposed within the case.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION OF THE INVENTION

Figure 1:
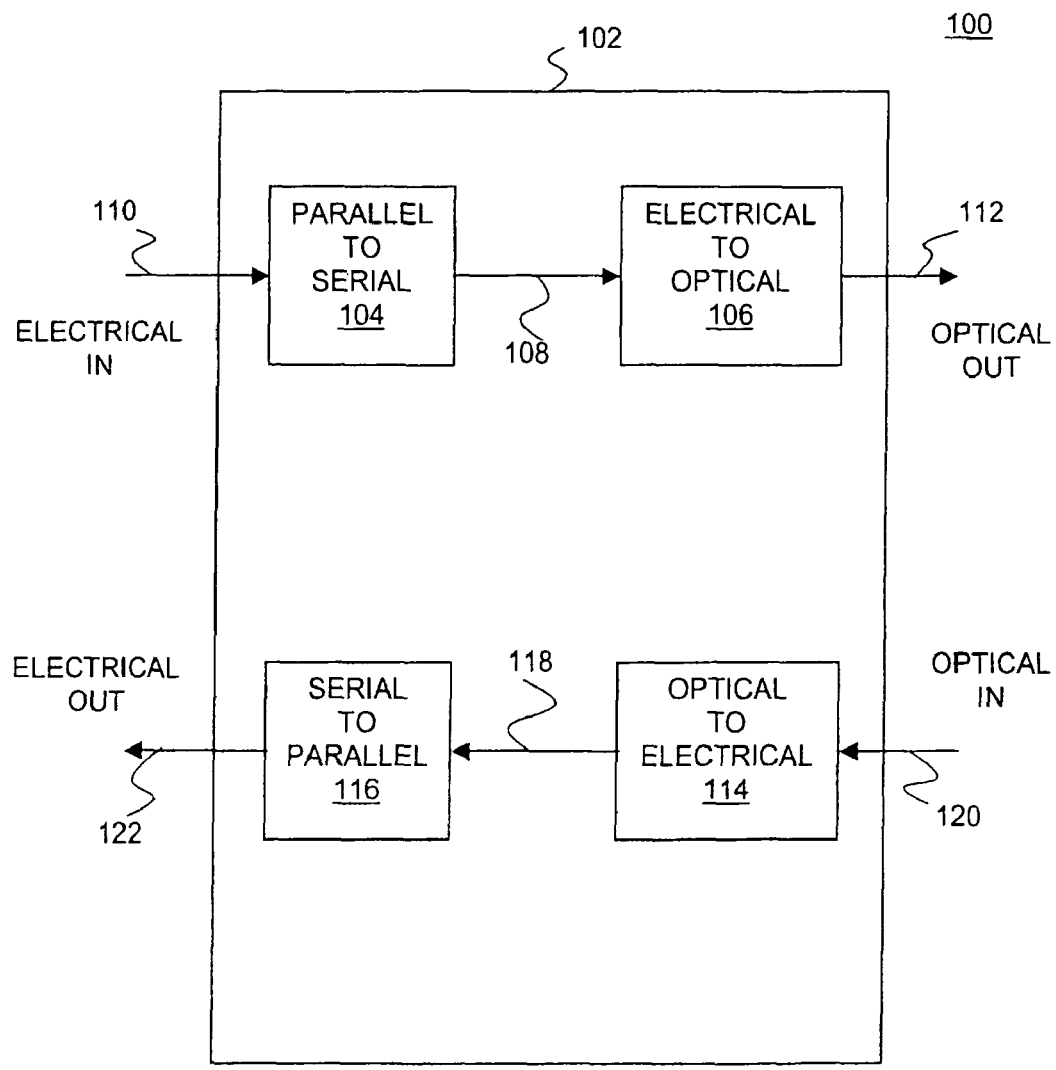
FIG. 1 is a high-level block diagram showing an optical transponder having a parallel-to-serial converter coupled to an electrical-to-optical converter, and an optical-to-electrical converter coupled to a serial-to-parallel converter, all housed in a physically protective and thermally conductive case, in accordance with the prior art.

Embodiments of the present invention calibrate, monitor, and control the components disposed within the case of an optical transponder module. For example, in one embodiment, a microcontroller inside an optical transponder provides an interface between the optical transponder and an external system to calibrate, monitor, and control the components of the optical transponder in an efficient and cost-effective manner. Some embodiments of the present invention calibrate, monitor, and control the optical transponder with a protective housing for the internal components of the optical transponder in place.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Reference herein to "one embodiment", "an embodiment", or similar formulations, means that a particular feature, structure, or characteristic described in connection with the embodiment, is included in at least one embodiment of the present invention. Thus, the appearances of such phrases or formulations herein are not necessarily all referring to the same embodiment. Furthermore, various particular features, structures, or characteristics may be combined in any suitable manner in one or more embodiments.

The term, microcontroller, generally refers to a class of integrated circuits, that includes, typically within a single chip, components such as, but not limited to, a central processing unit (CPU), a random access memory (RAM), a non-volatile memory, such as, but not limited to, a read only memory (ROM), that stores program code for execution by the CPU, a variety of input, output, input/output terminals (collectively referred to as ports), and may often include timer or counter circuits. Microcontrollers are sometimes referred to as embedded controllers, because they are part of an embedded system. Single-chip microcontrollers of a wide variety of architectures and specifications are commonly available from a broad range of manufacturers, and can be considered as a commodity item. As used herein, microcontroller refers to the definition above, as well as any other single-chip or multi-chip implementation of the logic required to provide the functionality described in connection with the various embodiments of the present invention.

The terms chip, integrated circuit, monolithic device, semiconductor device or component, and microelectronic device or component, are often used interchangeably in this field. The present invention is applicable to all of the above as they are generally understood in the field.

FIG. 1 is a high-level block diagram showing an optical transponder module 100 having a parallel-to-serial converter coupled to an electrical-to-optical converter, and an optical-to-electrical converter coupled to a serial-to-parallel converter, all housed in a physically protective and thermally conductive case, in accordance with the prior art. More particularly, a case 102 has disposed therein a parallel-to-serial converter 104, coupled to an electrical-to-optical converter 106, by way of a communications path 108. Communications path 108 is typically formed of an electrically conductive material disposed on an insulating substrate. Such an arrangement is typical of printed circuit boards. Parallel-to-serial converter 104 is adapted to receive electrical inputs at a plurality of input terminals which are coupled to electrical input communications path 110. Communications path 110 typically consists of a plurality of low-voltage swing differential signal line pairs. Electrical-to-optical converter 106 converts the serialized electrical data into modulated laser light which is then coupled onto optical output 112. Case 102 further has disposed therein, an optical-to-electrical converter 114, that is coupled to a serial-to-parallel converter 116. A communications path 118, typically consisting of electrically conductive material disposed on an insulating substrate, is used to transfer serial data, in electrical format, between optical-to-electrical converter 114, and serial-to-parallel converter 116. The output terminals of serial-to-parallel converter 116 are coupled to communications path 122. Communications path 122 typically consists of a plurality of low-voltage swing differential signal line pairs. Case 102 serves to provide both physical protection for the components of optical transponder module 100 and a thermally conductive pathway for removing waste heat from the various active components of optical transponder module 100.

Conventional optical transponders, such as the one illustrated in the high-level block diagram of FIG. 1, often employ control means such as jumpers, mechanical switches, and potentiometers to establish the digital and analog parameters necessary for the proper and correct functioning of those optical transponders, or similar modules. In order to conventionally make these adjustments, the optical transponder must have its outer case removed. Since this case serves to perform both a physically protective and a thermally dissipative function, these adjustments must be performed when the optical transponder is not in its intended configuration, thereby often leading to inaccurate calibration. Furthermore, reconfiguration of an optical transponder conventionally necessitates at least partial disassembly of the unit.

Conventional optical transponder interface standards, or specifications, require separate dedicated pins on the interface connector for the digital and analog control and monitoring functions. The functionality of such modules cannot easily be enhanced or modified unless general agreement within the industry can be established with respect to the function of the one or more connector pins that might be affected by a desired enhancement or modification. This inflexible architecture tends to increase the size, expense, and complexity of the interface connector and constitutes a significant barrier to innovations that could improve the functionality, reliability, and appropriateness for a particular purpose, of an optical transponder module.

Embodiments of the present invention provide methods and apparatus to achieve the monitoring and controlling of optical transponder modules and/or the components disposed within the case of an optical transponder module, including, in some embodiments, providing an interface to an external control module or other type of control system. In some embodiments, the functionality to support the above-mentioned monitoring and controlling is provided, at least in part, by computational resources such as, for example, microprocessors or microcontrollers that are included along with the other electronic component of the optical transponder module. Such microprocessors or microcontrollers are sometimes referred to as being embedded.

In some embodiments of the present invention, registered control bits are employed to perform the functions conventionally performed by means such as the jumpers and switches mentioned above. Such control bits may be incorporated within a microcontroller included within the optical transponder, or may be implemented with logic components outside of a microcontroller, but coupled thereto. The functionality of the conventional potentiometers, in some embodiments of the present invention, is performed by digital-to-analog converters (DACs). Further, in some embodiments, analog-to-digital converters (ADCs) are used variously to perform monitoring and closed-loop control functions.

In some embodiments, the control program and/or control parameters for a microcontroller in the optical transponder module can be electrically loaded using either an additional control interface, or through the aforementioned control interface, which may require using a multiplexer or other architecturally suitable means to separate the program code from the control and monitoring signals. It is noted that in some embodiments the control program and/or control parameters can be re-loaded, thereby providing for a repair, and/or modification process, in which corrected or updated program code can be provided to the program code memory of the microcontroller (which includes any other suitable stored program architecture device or devices, as that term is used herein). In such embodiments, any suitable type of nonvolatile memory may be used, such as, but not limited to, flash memory, electrically erasable/programmable memory (EEPROM), fuse or anti-fuse arrays, phase change material memories, battery-backed volatile memories, and so on. In still other embodiments, the control program for the microcontroller is stored in Read Only Memory (ROM) that is either integrated on a single chip with the microcontroller, or located external to the microcontroller but coupled thereto.

An architecture, in accordance with the present invention, provides for monitoring and controlling optical transponder modules without removing the physically protective and thermally conductive housing (i.e., case), which in turn allows for one or more of the manufacture, calibration, testing, maintenance, and operation of an optical transponder module in its complete form with the module case installed and the thermally conductive paths from the critical components in place. Since the optical transponder module is configured, calibrated, and monitored by signals communicated through the interface of the present invention, automated testing and calibration procedures, also in accordance with the present invention, are advantageously made available by such embodiments.

Figure 2:
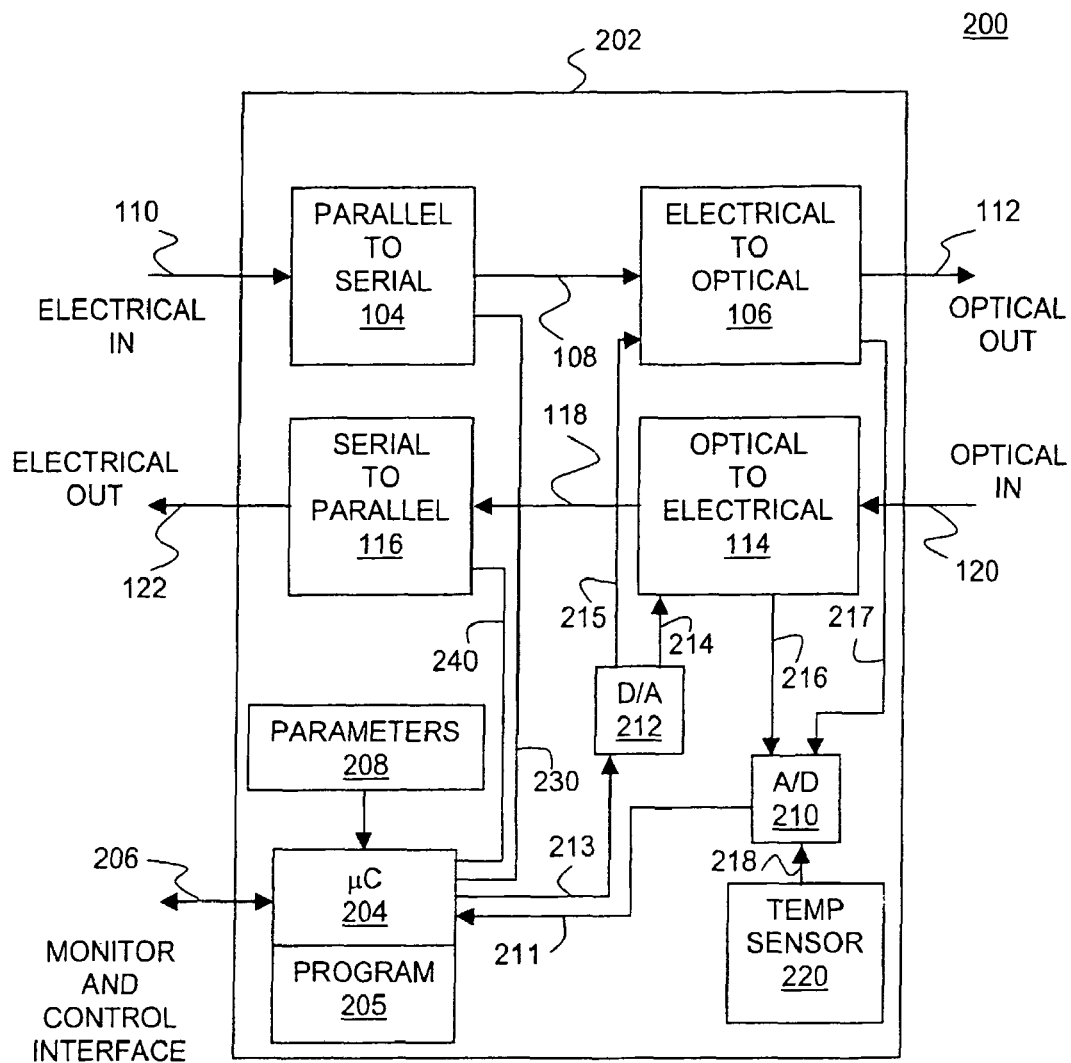
FIG. 2 is a block diagram showing an optical transponder having a parallel-to-serial converter coupled to an electrical-to-optical converter, an optical-to-electrical converter coupled to a serial-to-parallel converter, a microcontroller, having a program memory, coupled to a parameter memory, an analog-to-digital (A/D) converter, a digital-to-analog (D/A) converter, and a temperature sensor coupled to the A/D converter, all housed in a physically protective and thermally conductive case, in accordance with the present invention.

FIG. 2 is a block diagram showing an optical transponder module 200 having a parallel-to-serial converter coupled to an electrical-to-optical converter; an optical-to-electrical converter coupled to a serial-to-parallel converter; a microcontroller, having a program memory, coupled to a parameter memory; an analog-to-digital (A/D) converter coupled to the microcontroller; a digital-to-analog (D/A) converter coupled to the microcontroller; and a temperature sensor coupled to the A/D converter; all housed in a physically protective and thermally conductive case, in accordance with the present invention. More particularly, a case 202 has disposed therein a parallel-to-serial converter 104, coupled to an electrical-to-optical converter 106, by way of a communications path 108. Communications path 108 is typically formed of an electrically conductive material disposed on an insulating substrate. Parallel-to-serial converter 104 is adapted to receive electrical inputs at a plurality of input terminals which are coupled to electrical input communications path 110. Communications path 110 typically consists of a plurality of low-voltage swing differential signal line pairs. Electrical-to-optical converter 106 converts the serialized electrical data into modulated laser light which is then coupled onto optical output 112. Case 202 further has disposed therein, an optical-to-electrical converter 114, that is coupled to a serial-to-parallel converter 116. A communications path 118, typically consisting of electrically conductive material disposed on an insulating substrate, is used to transfer serial data, in electrical format, between optical-to-electrical converter 114, and serial-to-parallel converter 116. The output terminals of serial-to-parallel converter 116 are coupled to communications path 122. Communications path 122 typically consists of a plurality of low-voltage swing differential signal line pairs. Case 202 serves to provide both physical protection of the components of optical transponder module 200 and a thermally conductive pathway for removing waste heat from the various active components of optical transponder module 200. In this illustrative embodiment of the present invention, case 202 further has disposed therein, a microcontroller 204, and a program code memory 205 coupled to microcontroller 204. Microcontroller 204 may be any suitable device that provides the computational resources minimally required for any particular embodiment of the present invention. That is, embodiments in which more functionality is required by the designer, or in which more functionality per unit time is required, may use more powerful microcontrollers or other logic devices capable of providing the desired performance level. In this illustrative example, an eight-bit RISC-type microcontroller is used. In addition to providing the required computational resources, microcontroller 204 provides a plurality of terminals, which may be input terminals, output terminals, or bi-directional (i.e., I/O) terminals. In this field, such terminals of a microcontroller are often referred to as ports. Program code memory 205 may be integrated on the same chip on which microcontroller 204 is fabricated, or it may be a separate chip or chips. Program code memory 205 may be any suitable type of memory as noted in more detail above, however in the illustrative embodiment of FIG. 2, this memory is implemented as a programmable, non-volatile memory. By using a programmable, non-volatile memory as program code memory 205, embodiments of the present invention advantageously enable the updating or complete replacement of the stored instructions and/or data that control the operation of microcontroller 204, and thereby affect the operations of optical transponder module 200.

Still referring to FIG. 2, a connector 206 is built into case 202 and the terminals of connector 206 are electrically coupled to microcontroller 204. Connector 206 provides an input/output (I/O) pathway for communicating signals between microcontroller 204 and devices or systems external to optical transponder module 200. Other signal pathways, such as those of communication pathway 110 and communication pathway 122, may be bundled with connector 206. or in alternative embodiments may be made through a separate connector that is built into case 202. A parameter memory 208 is disposed within case 202 and coupled to microcontroller 204. Parameter memory 208 may be any suitable form of data storage device, but in the illustrative example of FIG. 2, it is implemented as a programmable, non-volatile memory such as flash memory or EEPROM. An A/D converter 210. having input terminals adapted to receive analog signals, and output terminals adapted to provide digital signals, is disposed within case 202. The digital output terminals of AID converter 210 are coupled respectively to input terminals of microcontroller 204 by electrical pathway 211. In the illustrative embodiment of FIG. 2, A/D converter 210 is coupled by electrical pathways 216, 217, and 218, respectively to optical-to-electrical converter 114, electrical-to-optical converter 106, and temperature sensor 220. Temperature sensor 220 may be implemented with any suitable component or components, such as for example, a thermistor configured to develop a voltage or current signal that is representative of the temperature in the region of optical transponder 200 in which the thermistor is located. In some embodiments, the AID functionality is incorporated within a microcontroller.

By converting one or more analog signals representative of various operational characteristics of optical transponder module 200 to digital format, microcontroller 204, or any other digital logic network may easily process the information, make decisions affecting performance, communicate status information to devices external to optical transponder module 200, store the status information for later review or retrieval, or any such combination of activities. By way of example and not limitation, a voltage representative of the temperature where temperature sensor 220 is located is coupled to A/D converter 210 which in turn provides a digital value corresponding to the temperature to microcontroller 204. Microcontroller 204 can then make a determination, by execution of stored instructions from program memory 205, as to whether any action is required in view of the value of the digitized temperature data.

Still referring to FIG. 2, a D/A converter 212, having input terminals adapted to receive digital signals, and output terminals adapted to provide analog signals, is disposed within case 202. The digital input terminals of A/D converter 212 are coupled respectively to output terminals of microcontroller 204 by electrical pathway 213. In alternative embodiments, the D/A functionality is integrated within a microcontroller. At least a first analog output terminal of D/A converter 212 is coupled to optical-to-electrical converter 114 by electrical pathway 214, and at least a second analog output terminal of D/A converter 212 is coupled to electrical-to-optical converter 106 by electrical pathway 215. By converting one or more digital values to analog signals, various circuit control functions may be implemented. By way of example and not limitation, control functions can be implemented for controlling optical power output levels of electrical-to-optical converter 114.

It is noted, with respect to the illustrative embodiment of FIG. 2, that circuits for implementing the functionality of D/A and A/D conversion may be integrated onto a single chip with a microcontroller, and that such modifications are within the scope of the present invention.

Not all signals require D/A or A/D conversion. For instance, in FIG. 2, electrical pathways 230 and 240 carried entirely digital control signals between microcontroller 204 and parallel-to-serial converter 104 and serial-to-parallel converter 116, respectively.

FIGS. 3-7 are flow charts illustrating various embodiments of the present invention, including methods of controlling the operation of optical transponders, monitoring the operating conditions of optical transponders and recording information regarding those conditions, monitoring the operating conditions of optical transponders and reporting on those conditions, monitoring and controlling the operations of optical transponders, and calibrating optical transponders.

Figure 3:
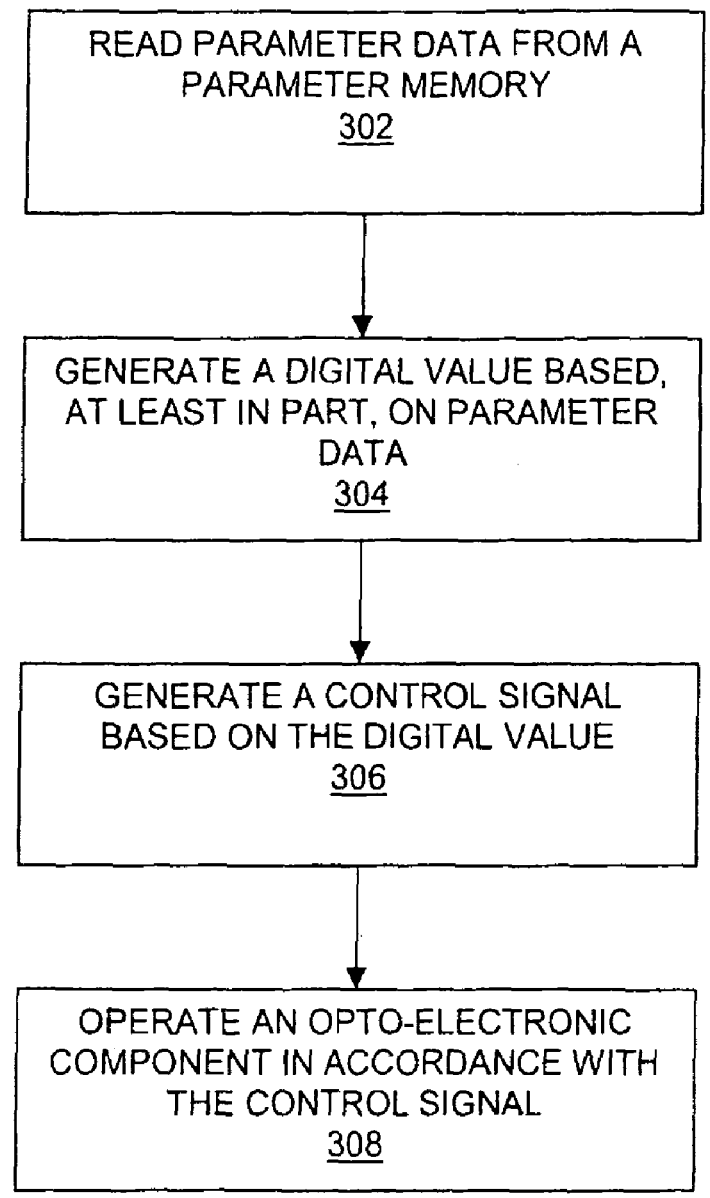
FIG. 3 is a flow chart illustrating a method of controlling the operation of at least one opto-electronic component disposed in an optical transponder module in accordance with the present invention.

FIG. 3 is a flow chart illustrating a method of controlling the operation of at least one opto-electronic component disposed in an optical transponder module in accordance with the present invention. More particularly, parameter data is read from a memory 302. This memory may be referred to as a parameter memory because of the nature of the data stored therein, but it is noted that the physical characteristics of the memory are not determined by the content of the data stored therein. The electrical characteristics of the parameter memory are described above in connection with FIG. 2. The parameter information is typically read from the parameter memory by a microcontroller. At least one digital value is then generated, based at least in part on the parameter data 304. Typically the microcontroller generates the digital value(s). The digital value(s) may be the same data that was read from the parameter memory, or it may be a function or functions of the parameter data. In the case where the at least one digital value is a function of the parameter data, it will be understood that the microcontroller may make adjustments based on its knowledge of the present operational status of the optical transponder module, such as for example, the temperature at a particular location within the optical transponder module.

Still referring to FIG. 3, a control signal is generated based, at least in part, on at least one digital value that was previously generated 306. The control signal may be digital or analog. Generating an analog control signal is typically accomplished by providing at least one digital value to the digital input terminals of an D/A converter, which in turn performs the conversion function and provides at its analog output terminals an analog signal. An opto-electronic component within the optical transponder module is then operated in accordance with the control signal, be it digital or analog 308. By way of example and not limitation, a bias circuit that provides part of the control network that operates a laser diode in an electrical-to-optical component, receives an analog control signal from the D/A converter such that the output characteristics of the laser diode are a function of that analog control signal.

Figure 4:
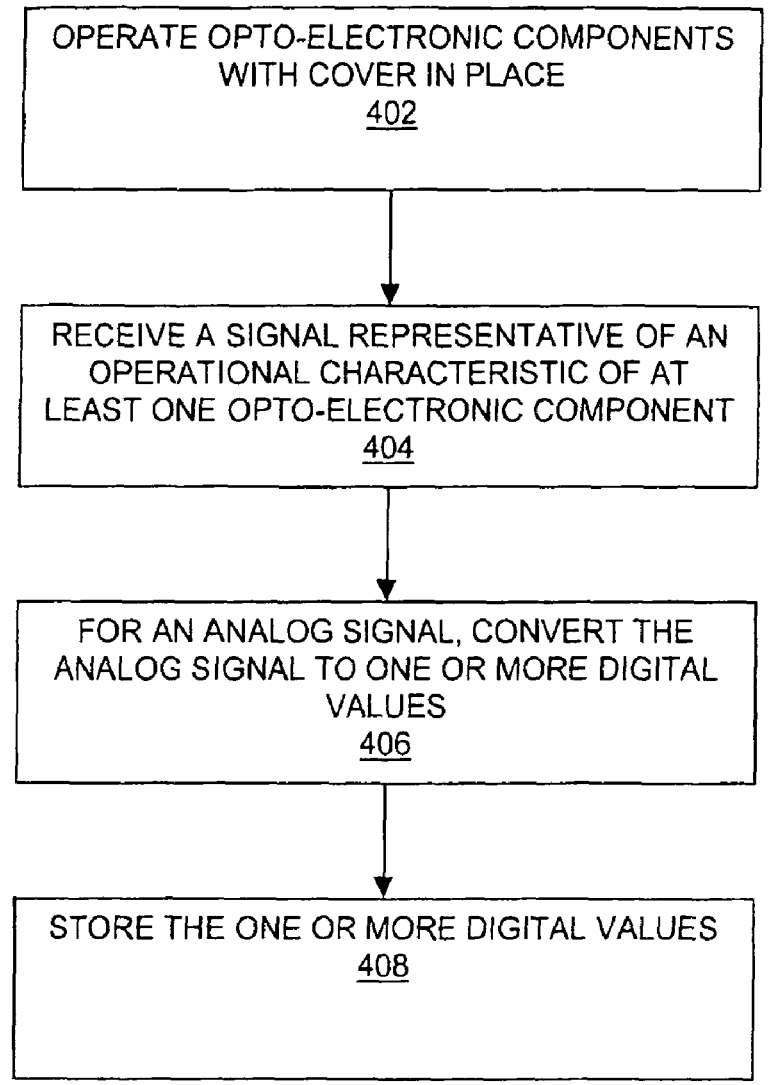
FIG. 4 is a flow chart illustrating a method of monitoring the operation of at least one opto-electronic component disposed in an optical transponder module, and recording information based the monitored operation in accordance with the present invention.

FIG. 4 is a flow chart illustrating a method of monitoring the operation of at least one opto-electronic component disposed in an optical transponder module, and recording information based on the monitored operation in accordance with the present invention. The process described in connection with FIG. 4 may be referred to as taking a snapshot of the operational status of the optical transponder. More particularly, one or more of the opto-electronic components of the optical transponder module are operated with the physically protective and thermally dissipative cover in place 402. A signal, representative of an operational characteristic of at least one of the opto-electronic components, is received 404. The signal may be analog or digital. For an analog signal, the signal is typically converted using an A/D converter to a digital format that may include one or more digital values 406. The digital values, which are representative of the operational characteristics are stored in a memory that is disposed within the optical transponder module 408. These values can subsequently be read out and communicated to external devices. It is noted that, in accordance with various embodiments of the present invention, additional information may be stored in the memory along with digital values derived from the analog signals. For example, the optical module may include a clock, or other time and/or date circuit, which can be read for the purpose of time-stamping the snapshot data.

Figure 5:
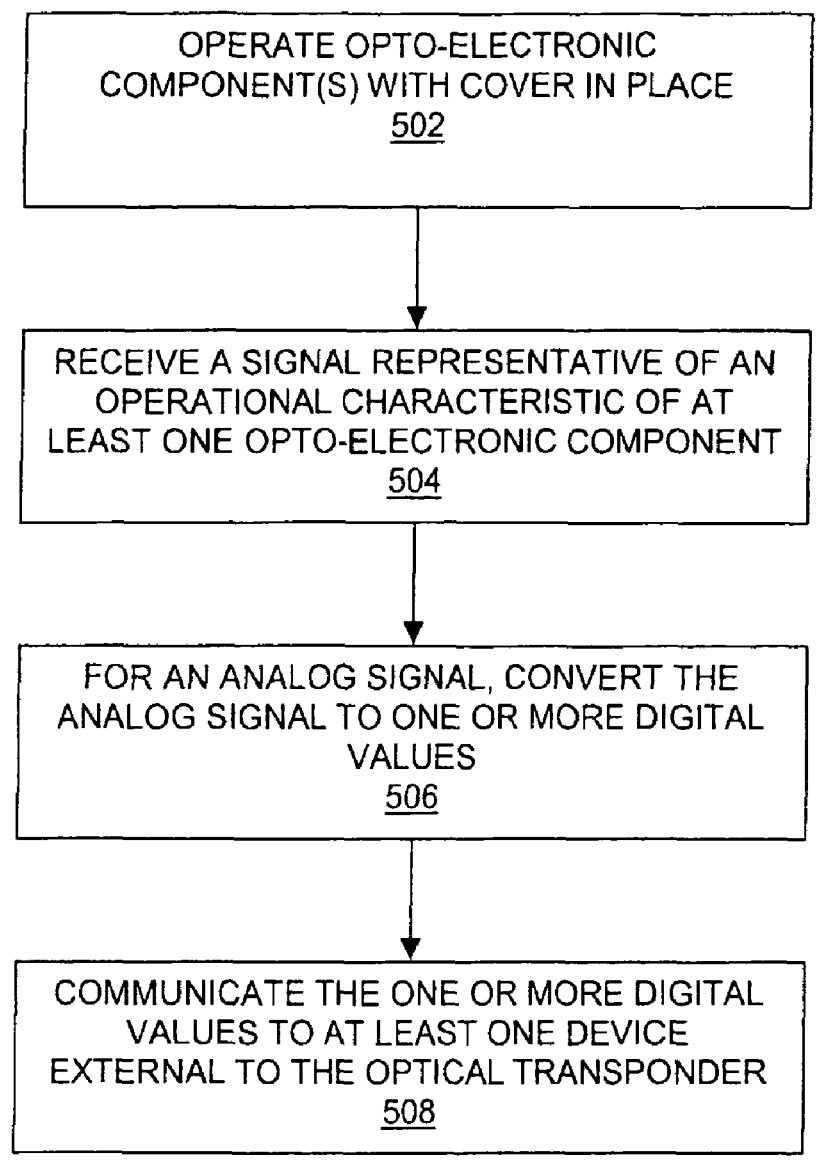
FIG. 5 is a flow chart illustrating a method of monitoring the operation of at least one opto-electronic component disposed in an optical transponder module, and reporting information to a device external to the optical transponder based on the monitored operation in accordance with the present invention.

FIG. 5 is a flow chart illustrating a method of monitoring the operation of at least one opto-electronic component disposed in an optical transponder module, and reporting information to a device external to the optical transponder based on the monitored operation in accordance with the present invention. More particularly, one or more of the opto-electronic components of the optical transponder module are operated with the physically protective and thermally dissipative cover in place 502. A signal, representative of an operational characteristic of at least one of the opto-electronic components, is received 504. The signal may be analog or digital. For an analog signal, the signal is typically converted using an A/D converter to a digital format that may include one or more digital values 506. The digital values, which are representative of the operational characteristics, are communicated to at least one device which is external to the optical transponder module 508. Operational characteristics include, but are not limited to, receive power, transmit power, and temperature. Those skilled in the art and having the benefit of this disclosure will recognize that other components, parameters, or operational characteristics of an optical transponder may also be monitored consistent with the present invention.

Still referring to FIG. 5, communication 508 of the digital values described above, is typically achieved by means of a wired connection between the optical transponder module and the at least one external device, however the present invention is not limited to wired communication. For example, in some embodiments a radio-frequency (RF), or an infra-red (IR) link may be used in place of a wired connection to communicate information between the optical transponder module and external devices or systems. In embodiments that use a wired connection between the optical transponder and an external device, any suitable architecture or design may be used. For example, architectures and physical connections such as but not limited to, a serial bus or a parallel bus may be used; single-ended or differential signaling may be used, twisted-pair or coaxial wiring may be used, synchronous or asynchronous signaling may be used, and so on. Those skilled in the art and having the benefit of the present disclosure will recognize that many wired interconnection schemes are available for implementing the communication pathway of the present invention.

It is noted that testing of an optical transponder may comprise the monitoring and reporting described above in connection with FIG. 5.

Figure 6:
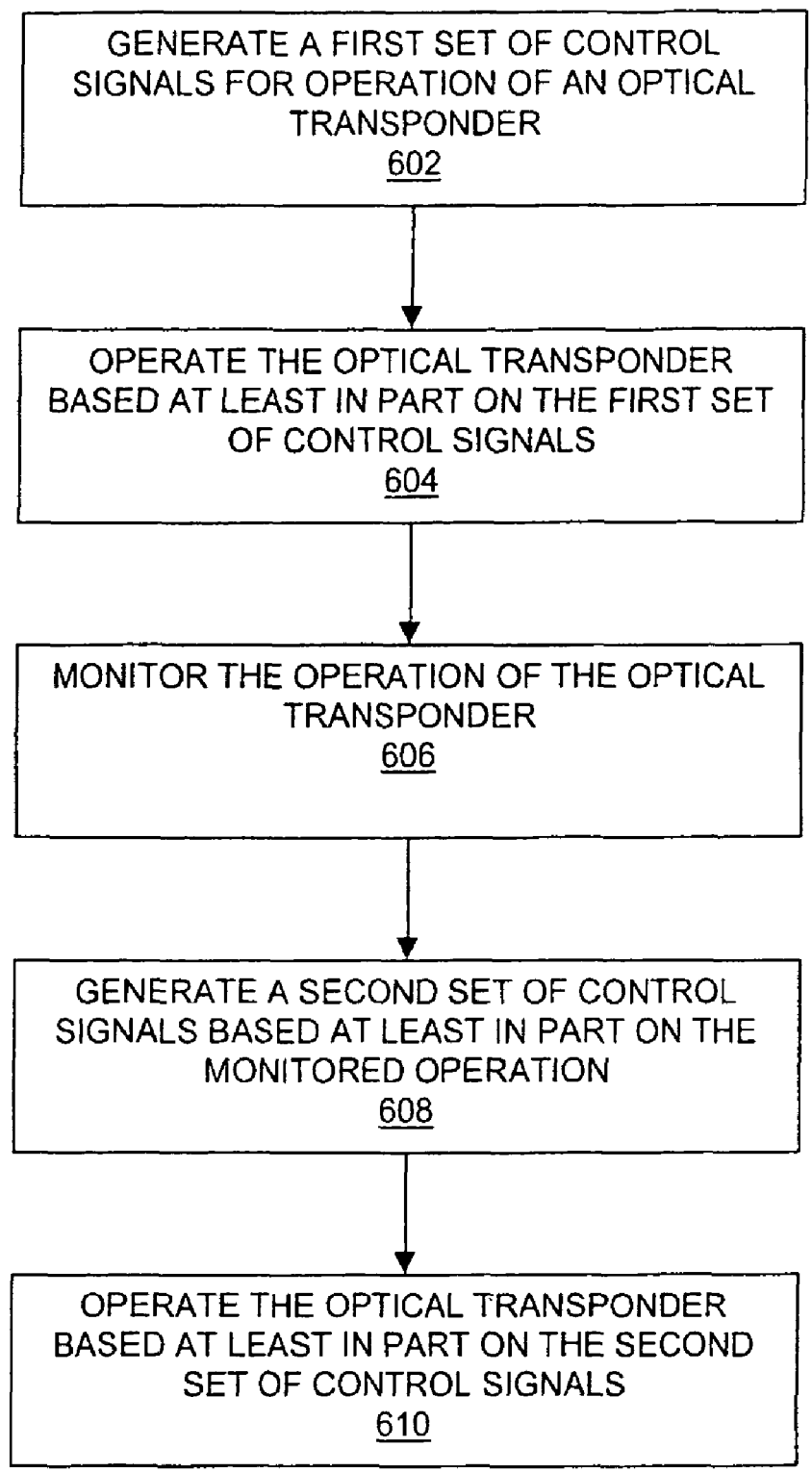
FIG. 6 is a flow chart illustrating a method of monitoring and controlling the operation of at least one opto-electronic component disposed in an optical transponder module in accordance with the present invention.

FIG. 6 is a flow chart illustrating a method of monitoring and controlling the operation of at least one opto-electronic component disposed in an optical transponder module in accordance with the present invention. More particularly, a first set of control signals for operation of an optical transponder are generated 602. In the illustrative embodiment of FIG. 2, some of the control signals are generated by the microcontroller providing digital values to at least one D/A converter, and the D/A converter(s) providing, in turn, analog control signals to an opto-electronic component such as an optical (e.g., laser) transmitter circuit, or an optical (e.g., photodiode) receiver circuit. The optical transponder, including the opto-electronic components thereof, is operated, based at least in part, on the first set of control signals 604. The operation of the optical transponder is monitored 606. In the embodiment of FIG. 2, monitoring certain components of the optical transponder includes converting an analog voltage at one or more nodes to digital values and providing those digital values to a microcontroller disposed within the case of the optical transponder. The microcontroller, under control of its stored program instructions, then evaluates the operation of the optical transponder by, among other things, comparing laser transmit power, receive current, module temperature, and so on, to expected operating values. Based at least in part on the monitored operations, a second set of control signals is generated 608. In the embodiment of FIG. 2, generating some control signals in the second set is accomplished by the microcontroller providing one or more digital values to one or more D/A converters (or alternatively to one or more D/A channels of a D/A converter). The corresponding analog output signals produced by the D/A converters being coupled to the various components produce changes in the operational characteristics of those components. In other words, the optical transponder is operated, based at least in part, on the second set of control signals 610. By way of example and not limitation, the microcontroller may determine that the temperature of the optical transponder is such that the bias voltage applied to a laser transmitter should be increased, and therefore change the digital value applied to the D/A channel that drives the bias input node of the laser transmitter. In this way, the optical transponder is operated and monitored, and changes are automatically made in various control signals to compensate for drifting operational characteristics, or for any other suitable reason.

Figure 7:
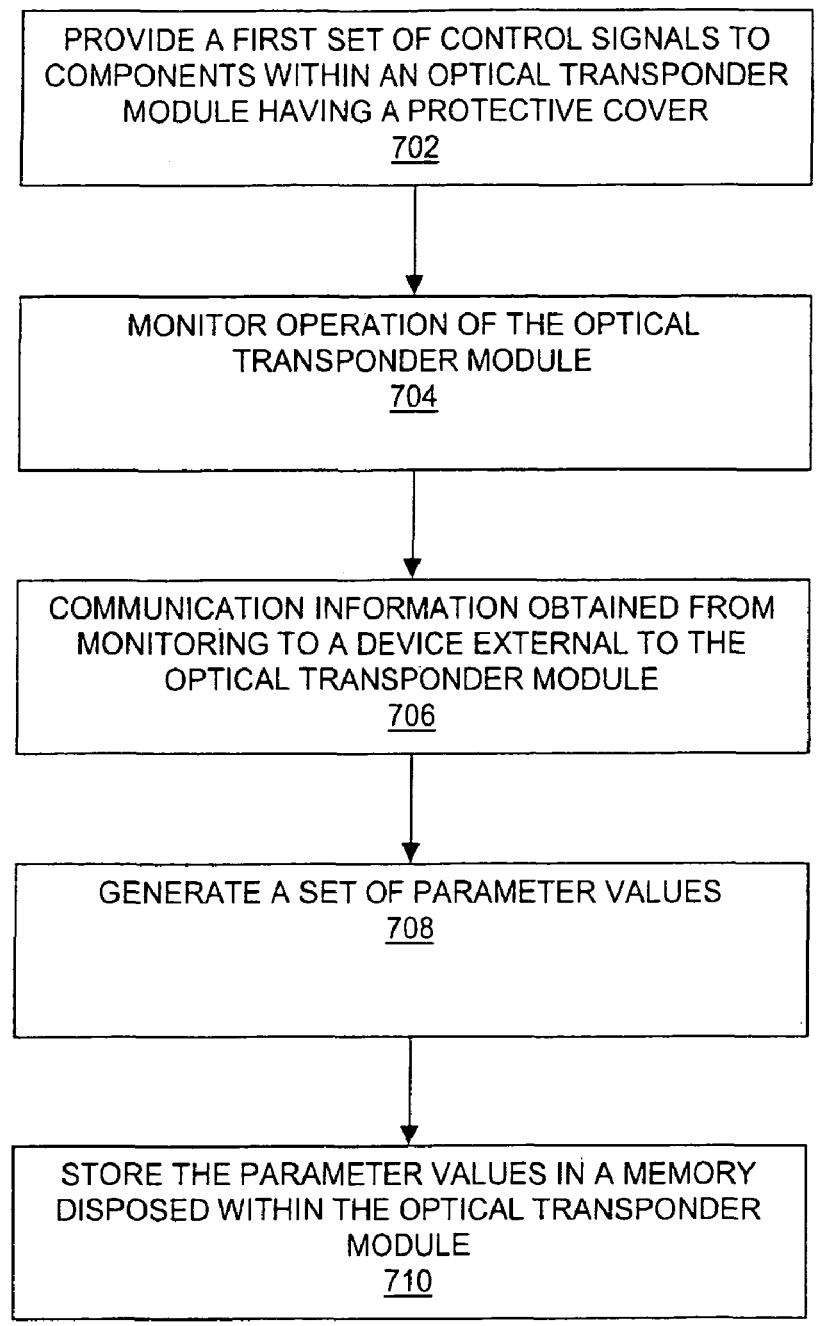
FIG. 7 is a flow chart illustrating a method of calibrating the operation of at least one opto-electronic component disposed in an optical transponder module in accordance with the present invention.

FIG. 7 is a flow chart illustrating a method of calibrating the operation of at least one opto-electronic component disposed in an optical transponder module in accordance with the present invention. In some embodiments of the present invention, a microcontroller and D/A converters within the optical transponder provide control signals that are generated, based at least in part, on a stored control program executed by the microcontroller. However, when a number of optical transponders are manufactured, there may be differences in the performance of each of them due to the variances in the characteristics of individual components of the optical transponder. FIG. 7 illustrates a calibration process in which the optical transponder, having its physically protective and thermally dissipative cover in place, is operated, measurements made, and calibration parameters developed and stored in a memory within the optical transponder. The calibration parameters are used by the stored control program executed by the microcontroller to fine tune the control signals to compensate for various manufacturing differences in each unit. More particularly, a first set of control signals is provided to components within an optical transponder module having a protective cover in place, and the optical transponder is operated 702. The operation of the optical transponder is monitored 704. Monitoring may include, but is not limited to, sensing the temperature of the optical transponder at one or more locations, sensing the transmit power, and sensing the receive power. Information obtained from monitoring is communicated to a device, or devices, external to the optical modulator 706. A set of parameter values is then generated 708. Generation of the set of parameter values is typically performed by a device, such as but not limited to a computer, external to the optical transponder. Subsequently, the parameter values are stored in a memory disposed with the optical transponder module 710. In this way, unit to unit performance variations can be reduced, by compensating, i.e., changing, the values used in the generation of control signals. For example, the optical output power levels applied to an optical transmitter circuit can be modified from nominal to adjust for variances in performance that typically arise from the accumulation of manufacturing tolerances.

Thus, it can be seen from the above descriptions that methods and apparatus for calibrating, monitoring, and controlling optical transponders have been described.

Some advantages of various embodiments of the present invention include the architectural flexibility to enhance or modify the functionality of an optical transponder module without having to define a new interface connector standard.

Another advantage of some embodiments of the present invention include the ability to engage in automated testing of the optical transponder module while the physically protective and thermally conductive case, or housing, of the optical transponder module is in place.

Various aspects of the present invention may be implemented as circuit-based solutions, including possible implementation on a single integrated circuit. As would be apparent to one skilled in the art, various functions of circuit elements may also be implemented as processing operations in a software program. Such software may be employed in, for example, a digital signal processor, a microcontroller, a special-purpose computer, or a general-purpose computer.

The present invention can be embodied in the form of methods, and apparatus for practicing those methods. Various aspects of the present invention can also be embodied in the form of program code embodied in tangible media, such as punched cards, magnetic tape, floppy disks, hard disk drives, CD-ROMs, flash memory cards, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates in a manner analogous to hardwired logic circuits.

While the present invention has been described in terms of the above-described embodiments, those skilled in the art will recognize that the invention is not limited to the embodiments described. The present invention can be practiced with modification and alteration within the spirit and scope of the appended claims. Thus, the description herein is to be regarded as illustrative rather than restrictive with respect to the present invention.

What is claimed is:

1. A method of making an optical transponder, the method comprising:
   positioning a plurality of electrical and optical components within a housing, wherein the housing is configured to thermally conduct heat away from the optical components, and wherein the plurality of electrical and optical components include an electrical-to-optical converter and an optical-to-electrical converter;
   positioning a microcontroller within the housing, wherein the microcontroller is configured to communicatively interface with a controller located external to the housing;
   coupling a first input of an analog-to-digital (A/D) converter to the electrical-to-optical converter, a second input terminal of the A/D converter to the optical-to-electrical converter, and at least a first output terminal of the A/D converter to the microcontroller;
   positioning a first memory within the housing, wherein the first memory is configured to store at least one software program which is accessible and executable by the microcontroller;
   coupling the first memory to the microcontroller;
   providing electrical communication pathways between the microcontroller and at least one device located external to the housing; and
   positioning a second memory within the housing, wherein the second memory is configured to store calibration parameters;
   wherein the method of making enables a calibration of the optical transponder to be performed with the housing in place.

2. The method of claim 1, further comprising:
   positioning within the housing a laser configured to provide an optical output signal; and
   positioning within the housing a photodiode configured to receive an optical input signal.

3. The method of claim 1, further comprising positioning a temperature sensor within the housing and electrically coupling the temperature sensor to the microcontroller, wherein the temperature sensor comprises a thermistor.

4. The method of claim 1, wherein the first memory comprises a non-volatile program code memory.

5. The method of claim 1, wherein the microcontroller is further configured to evaluate operation of the optical transponder by comparing at least one of a laser transmit power, receive current, or module temperature to expected operating values.

6. The method of claim 1, wherein the second memory includes a flash memory or electrically-erasable programmable memory (EEPROM).

7. The method of claim 1, wherein the method of making enables the microcontroller to make adjustments based on a present operational status of the optical transponder.

8. The method of claim 1, wherein the method of making enables the stored calibration parameters to be used by the at least one software program executed by the microcontroller to fine tune control signals.

9. The method of claim 1, further comprising coupling a sensor to the A/D converter, wherein the sensor is configured to provide a digital value corresponding to a temperature to the microcontroller.

10. The method of claim 1, further comprising coupling a plurality of digital input terminals for a digital-to-analog (D/A) converter to the microcontroller within the housing, wherein the D/A converter is configured to convert one or more digital values to analog signals to implement control functions for controlling optical power output levels of the electrical-to-optical converter.

11. The method of claim 1, wherein said providing electrical communication pathways between the microcontroller and the at least one device external to the housing comprises coupling the optical transponder to the at least one device via a wired connection to provide to the external device a digital value representative of an operational characteristic of at least one of the plurality of electrical and optical components.

12. A method of making an optical transponder, the method comprising:
   providing electrical and optical components including:
      a parallel-to-serial converter configured to receive a first plurality of electrical signals, wherein the parallel-to-serial converter has at least one output terminal;
      an electrical-to-optical converter having an input terminal configured to be coupled to the output terminal of the parallel-to-serial converter, and having an output terminal configured to provide at least one optical signal;
      an optical-to-electrical converter having an input terminal configured to receive the at least one optical signal and having an output terminal configured to provide an electrical signal;
      a serial-to-parallel converter having an input terminal configured to be coupled to the output terminal of the optical-to-electrical converter, and having a plurality of output terminals configured to provide a second plurality of electrical signals;
      a microcontroller;
      an analog-to-digital (A/D) converter having a first input terminal coupled to the electrical-to-optical converter, a second input terminal coupled to the optical-to-electrical converter, and at least a first output terminal coupled to the microcontroller;
      at least one temperature sensor coupled to the microcontroller; and
      a memory coupled to the microcontroller, wherein the memory is configured to store at least one software program which is accessible and executable by the microcontroller; and
   positioning the electrical and optical components within a case.

13. The method of claim 12, wherein the electrical and optical components further comprise:
   a digital-to-analog (D/A) converter having a plurality of digital input terminals coupled to the microcontroller, and having a plurality of analog output terminals, wherein at least a first one of the analog output terminals is configured to be coupled to the electrical-to-optical converter; and
   wherein the analog-to-digital (A/D) converter includes a plurality of analog input terminals and a plurality of digital output terminals, and wherein the plurality of digital output terminals are configured to be coupled to the microcontroller.

14. The method of claim 13, wherein at least a second one of the plurality of D/A converter analog output terminals is configured to be coupled to the optical-to-electrical converter.

15. The method of claim 13, further comprising coupling an electrical connector between the microcontroller and at least one device external to the case, wherein the electrical connector is configured to provide a plurality of input, output, and bi-directional electrical signal paths between the microcontroller and the at least one device external to the case.

16. The method of claim 12, wherein said providing the electrical and optical components comprises coupling a program code memory to the microcontroller.

17. The method of claim 16, wherein the method of making enables use of a radio-frequency (RF) or infra-red (IR) link to communicate information between the optical transponder external devices or systems.

18. A method of making an optical transponder, the method comprising:
    positioning a microcontroller within a housing including a plurality of electrical and optical components, wherein the microcontroller includes a program memory configured to store at least one software program which is accessible and executable by the microcontroller, and wherein the plurality of electrical and optical components include an electrical-to-optical converter and an optical-to-electrical converter;
    coupling a first input of an analog-to-digital (A/D) converter to the electrical-to-optical converter, a second input terminal of the A/D converter to the optical-to-electrical converter, and at least a first output terminal of the A/D converter to the microcontroller; and
    coupling a parameter memory to the microcontroller, wherein the microcontroller is configured to calibrate the optical transponder based on parameter data read from the parameter memory and to generate at least one digital value based, at least in part, on the parameter data and information about a present operational status of the optical transponder.

19. The method of claim 18, wherein the method of making enables the microcontroller to make a determination, by execution of the at least one software program in the program memory, as to whether any action is required in view of parameter data.

20. The method of claim 18, wherein the information about the present operational status of the optical transponder comprises information about a temperature at a particular location within the optical transponder.

21. The method of claim 18, wherein the calibration of the optical transponder by the microcontroller is configured to occur with the housing in place.

22. The method of claim 18, wherein the housing is configured to physically protect the optical components and to conduct heat away from the optical components.

23. The method of claim 18, further comprising providing electrical communication pathways between the electrical components and at least one device located external to the housing.

24. The method of claim 18, further comprising positioning within the housing a laser configured to provide an optical output signal.

25. A method of making an optical transponder, the method comprising
    positioning a microcontroller within a housing including a plurality of electrical and optical components, wherein the plurality of electrical and optical components include an electrical-to-optical converter and an optical-to-electrical converter;
    coupling a first input of an analog-to-digital (A/D) converter to the electrical-to-optical converter, a second input terminal of the A/D converter to the optical-to-electrical converter, and at least a first output terminal of the A/D converter to the microcontroller;
    coupling a parameter memory to the microcontroller within the housing, wherein the parameter memory is configured to store calibration information; and
    coupling a plurality of digital input terminals for a digital-to-analog (D/A) converter to the microcontroller within the housing, wherein the D/A converter and the microcontroller are configured to provide control signals that are generated based, at least in part, on a stored control program executed by the microcontroller and the stored calibration information in the parameter memory.

26. The method of claim 25, further comprising coupling an electrical connector between the microcontroller and at least one device external to the housing, wherein the electrical connector is configured to provide a plurality of input, output, and bi-directional electrical signal paths.

27. The method of claim 25, further comprising:
    positioning within the housing a laser configured to provide an optical output signal; and
    positioning within the housing a photodiode configured to receive an optical input signal.

* * * * *

UNITED STATES PATENT AND TRADEMARK OFFICE
CERTIFICATE OF CORRECTION

| | | |
|---|---|---|
| PATENT NO. | : 7,908,038 B2 | Page 1 of 1 |
| APPLICATION NO. | : 11/513752 | |
| DATED | : March 15, 2011 | |
| INVENTOR(S) | : Crosby et al. | |

It is certified that error appears in the above-identified patent and that said Letters Patent is hereby corrected as shown below:

Page 2, item (56), under "Other Publications", in Column 2, Line 29, delete "12/177,684," and insert -- 12/177,681, --.

Column 1, line 3, below "Title" insert -- CROSS REFERENCE TO THE RELATED APPLICATION --.

Column 13, line 16, in Claim 17, delete "external" and insert -- and external --.

Column 14, line 15, in Claim 25, delete "comprising" and insert -- comprising: --.

Signed and Sealed this
Nineteenth Day of July, 2011

David J. Kappos
*Director of the United States Patent and Trademark Office*